United States Patent [19]
Brickey

[11] Patent Number: 5,355,614
[45] Date of Patent: Oct. 18, 1994

[54] INTERNAL BAIT WEIGHT APPARATUS

[76] Inventor: Jeffrey L. Brickey, 2402 Killarney Way SE., Bellevue, Wash. 98004-7038

[21] Appl. No.: 70,607

[22] Filed: Jun. 1, 1993

[51] Int. Cl.$^5$ .............................................. A01K 91/00
[52] U.S. Cl. ..................................... 43/43.1; 43/44.2
[58] Field of Search ................... 43/43.1, 44.2, 44.8, 43/44.81, 43.12

[56] References Cited

U.S. PATENT DOCUMENTS

| | | | |
|---|---|---|---|
| 2,093,954 | 9/1937 | Chilcott | 43/44.2 |
| 2,157,333 | 5/1939 | Hadaway | 43/44.2 |
| 2,476,126 | 7/1949 | Weiss | 43/44.2 |
| 3,624,950 | 12/1971 | Merckes | 43/44.2 |
| 3,839,814 | 10/1974 | Sykora | 43/44.2 |
| 3,905,149 | 9/1975 | McCloud | 43/44.2 |
| 4,850,132 | 7/1989 | Motyka | 43/44.2 |

*Primary Examiner*—P. Austin Bradley
*Assistant Examiner*—Chuck Y. Mah
*Attorney, Agent, or Firm*—Steven P. Koda

[57] ABSTRACT

A line fishing apparatus having a generally bulbous head and tapered tail is inserted inside a fish used for bait. Before the apparatus is inserted, the apparatus slides freely along the fishing line. The bulbous head portion is shaped to fit the inner dimensions of the bait's mouth. When the bait's mouth is closed around the apparatus, a bumper portion sticks out from the mouth protecting the head of the fish from striking bottom. As the apparatus is inserted, the tail portion is pushed through the bait's stomach toward the bait's tail. The apparatus tail portion is curved along an arc as it tapers to a distal end. The curvature forces the bait to curve along its length. As a result, when the line is pulled through the water, a swinging or spinning action is induced. The swimming motion generally resembles that of a live, injured fish. The apparatus tail portion is generally rigid to maintain its curvature, yet malleable enough for a fisherman to bend so as to change the curvature, and thus, the swimming action. A channel is formed through the bulbous head for receiving fishing line and hooks. One end of the channel is tear-shaped, while the other end is key-hole shaped. The line and hooks are inserted through the tear-shaped end and come out the key-hole. The hooks then are set in the bait fish. The key-hole is shaped so that pull on the line forces the hooks toward an area of the key-hole through which the eye of the hook can not fit. The tear-shaped end closest to the pole, however, allows the line to play relative to the bait's mouth. As the line is pulled, a ridge formed between the tear-shaped opening and the bumper protects the bait's lower jaw from being torn.

19 Claims, 4 Drawing Sheets

INTERNAL BAIT WEIGHT APPARATUS

BACKGROUND OF THE INVENTION

This invention relates to fishing tackle used in line fishing with natural fish bait, and more particularly to a weight or lure apparatus that fits inside a fish to be used as bait.

Natural fish bait such as herring, shad, anchovies, candlefish and sardines are used to attract various sport and commercial fish species (i.e., salmon, halibut, cod, swordfish or any other fish which eats bait fish.) Many different line fishing methods are used. For each line fishing method a weight is usually attached to the line to lower the bait to a desired depth range. Typically the weight is positioned some distance up the line from the bait. Due to a counter-balance effect of the weight and the bait, the line sometimes gets tangled. Accordingly, there has long been a need to find a way for rigging a weighted line in a more effective manner to avoid tangles.

When using natural bait it is desirable to control the line and bait so that the bait simulates the motion of an injured fish. In one method of baiting hooks, natural fish bait is cut in a way that causes the fish to spin or swing as it is pulled through the water. Unfortunately, the fish is unstable and frequently becomes partially unhooked. When that occurs, the fish bait is dragged by the tail and bears no resemblance to the swimming pattern of a live fish. In another method a bend in the bait is formed using a slip-hook setup where the line holds the bait at a bend. When the line is tugged or jerked, however, the bend often changes or comes out. In another method the bend is held with a tooth-pick. However, frequently the fish straightens out on the toothpick or the toothpick falls out. Accordingly, there is a need for controlling the movement of the fish bait to more closely resemble the swimming pattern of a live fish with more reliability and durability. One solution used for anchovy bait is an anchovy holder. The anchovy holder includes a plastic cap connected to a bendable wire. The wire is pushed into the anchovy body so that the head mates into the plastic cap. The wire then is bent to a desired curve. A solution, however, is needed for many different sizes and types of natural fish bait.

There are many different line fishing methods, including trolling, mooching, jigging, down rigging, and bottom fishing. Typically a line is rigged in a different manner for each method. When the angler changes methods, either he uses a different pole with the desired rigging, or he re-rigs his active pole. Using different poles requires the expense of extra poles. Re-rigging a single pole requires time to perform the re-rigging. Accordingly, there is a need for a rigging that accommodates multiple line fishing methods or that is easily and quickly convertible to accommodate another method.

These and other problems are addressed by the internal bait weight apparatus of this invention.

SUMMARY OF THE INVENTION

According to the invention, an apparatus having a generally bulbous head and tapered tail is inserted inside a fish, such as a herring, that is used as bait. The "bait" fish attracts larger "sport" or "commercial" fish. The apparatus is inserted into the mouth of the bait, with the apparatus tail end pushed through the bait's mouth and stomach toward the bait's tail. The bait fish with the inserted apparatus can be used for many natural bait, line-fishing methods for catching "sport" or "commercial" fish. In alternate embodiments, the apparatus varies in weight to enable the bait to descend to a desired depth and the size varies to fit into different sized bait. In one embodiment, the weight of the apparatus is relatively light so that the bait fish "swims" (i.e., is pulled) near the surface.

According to one aspect of the invention, the bulbous head portion is generally shaped to fit the inner dimensions of the bait's mouth. In one embodiment the bulbous head has an elongated indentation along its base. The neck cartilage along the bottom of the bait's mouth fits into the indentation enabling the apparatus to fit better without rotating within the fish. The channel also enables the apparatus to fit better so that the bait's mouth closes around the apparatus.

According to another aspect of the invention, the bulbous head is angled relative to the apparatus tail to provide a center of balance near or forward of the bait's center of balance. As the bait with the internal weight apparatus is pulled through the water, the bait "swims" in a more realistic motion.

According to another aspect of the invention, the apparatus tail portion is curved along an arc as it tapers to a distal end. The curvature forces the bait to take on the curved shape. As a result, when the bait is pulled through the water, the bait swings back and forth (i.e., wobbles) or spins. The fisherman controls the speed of motion by the pull on the line. The fisherman controls the action of the motion (i.e., degree of spin for a given speed) by the amount of bend in the tail portion. The motion of the bait generally resembles that of a living, injured fish making the bait more attractive to sport and commercial fish.

According to another aspect of the invention, the tail is generally rigid to maintain its curvature, yet malleable enough for a fisherman to bend the tail to change the curvature. In one embodiment the tail has two generally flat side walls and contour lines along its top and bottom surfaces for controlling the plane of the curvature. When a fisherman bends the tail portion, the tail portion curves along the contour lines without significantly twisting the flat surfaces.

According to one embodiment the tail also tapers off to a blunt or rounded distal end, rather than to a sharp, pointed end. The rounded end reduces the risk that the apparatus will be pushed through the side of the fish when it is inserted. In particular, when the tail portion is pushed past the stomach breaking into the tail section of the bait, the rounded end reduces the chance of having the apparatus poke through the side of the fish.

According to another aspect of the invention, the bulbous end of the apparatus includes a protruding bumper. When the mouth of the bait is closed around the apparatus, the bumper portion sticks out from the mouth. Because the bulbous end is heavier than the tail end, the bait sinks head first in water. When the bait sinks and strikes bottom, the bumper takes the shock, instead of the bait. Thus, the bait's mouth is not damaged and may serve as bait for a longer time period. Further, once the bait strikes bottom, the bait tends to fall on its side. As a result, hooks rigged to the top surface of the bait tend to lay off to the side rather than fall straight to the sea bottom. As a result, the risk of snagging the line on the bottom also is reduced.

According to another aspect of the invention, a channel is formed through the bulbous head for receiving the fishing line and the fish hooks. One end of the channel is tear-shaped, while the other end is key-hole shaped. The line and hooks are inserted through the tear-shaped end and come out the key-hole. The hooks then are set in the bait. The line is then tightened pulling the eye of the top hook toward the key-hole. The key-hole is shaped so that pull on the line forces the hooks toward an area of the key-hole too narrow for the eye to fit. The tear-shaped end closest to the pole allows the line to move and be played near the bumper.

According to another aspect of the invention, the channel openings in the bulbous head are on opposite sides of the bumper. A ridge is formed between the bumper and the tear-shaped opening to protect the lower jaw of the fish when the line is taut. The ridge, in effect, prevents the lower jaw from being torn when the line is pulled.

According to another aspect of the invention, the apparatus slides along the line before installation into the bait. The hooks at the end of the line and the key-hole shaped opening in the apparatus prevent the apparatus from sliding off the line. When the hooks are placed in the bait, the bait prevents the apparatus from sliding back up the line. When a fish takes the bait, the fish shakes its head vigorously back and forth. This motion separates the hooks from the bait and the apparatus. The fish tries to swim away with the hook, which pulls the line through the apparatus and the bait. As a result, the hooked fish does not get the benefit of the apparatus as leverage. For example, if the apparatus stayed in the bait during the vigorous back and forth motion, the weight of the apparatus may tear the hooks from the hooked fish enabling the fish to get away. Also, if the hooked fish breaks the leader and swims off trailing the leader with the hooks still caught, the apparatus will fall off and not drag on the fish.

Advantages of the invention include a reduced risk of tangles, particularly for vertically jigging where in prior riggings, the weight would sink faster than the bait and get tangled in the line. Other advantages include induced spinning of the bait to simulate a living, injured fish; the ability to use standard mooching riggings for various fishing methods; and a prolonged use of the bait without damage.

These and other aspects and advantages of the invention will be better understood by reference to the following detailed description taken in conjunction with the accompanying drawings.

DESCRIPTION OF SPECIFIC EMBODIMENTS

Overview

Figure 1:
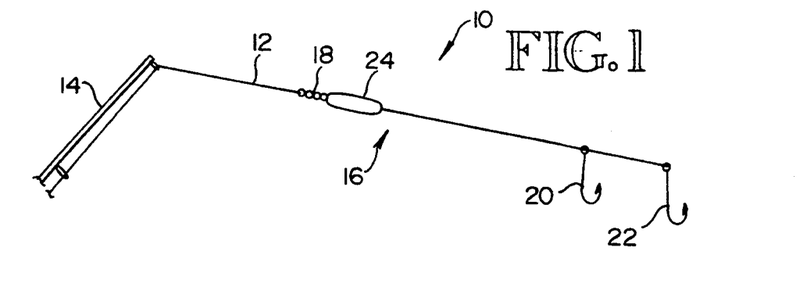
FIG. 1 is a diagram of a conventional mooching line rigging.

FIG. 1 shows a diagram of a conventional fishing line rigging 10 used for mooching. The fishing line 12 extends from a pole 14 to a leader section 16. The leader section 16 is coupled to the remaining line 12 with a swivel or bead chain 18. At the end of the leader 16 are a pair of hooks 20, 22 (i.e., top hook 20 and bottom hook 22). Bait is attached to the leader 16 at the hooks 20, 22. When a fish goes for the bait, the fish gets caught on the hooks 20, 22. To get the line 12 to a desirable water depth conventional weights are attached to the line 12 or leader 16. A mooching sinker weight 24 is shown tied to the leader 16.

It is desirable to achieve a rigging that can be used in many alternative natural bait, line-fishing methods. During use of the mooching rigging of FIG. 1, however, the weighted portion of the line 12, 16 tends to sink faster than the bait. Thus, if this rigging 10 were used for jigging (i.e., steady rhythmic jerking of the line), and in particular vertical jigging, the sinker 24 quickly descends to the baited line and may tangle with the line, hooks and/or bait. Thus, an alternative rigging is needed to accommodate both mooching and jigging. According to the invention, the weight 24 is replaced with an internal bait weight apparatus 30.

Figure 2:
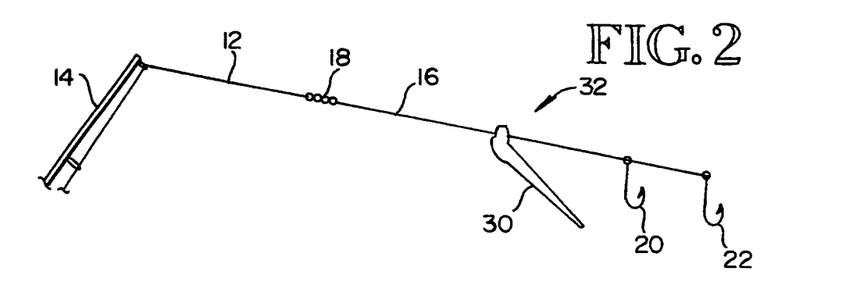
FIG. 2 is a diagram of a fishing line rigged with the internal bait weight apparatus of this invention.
Figure 3:
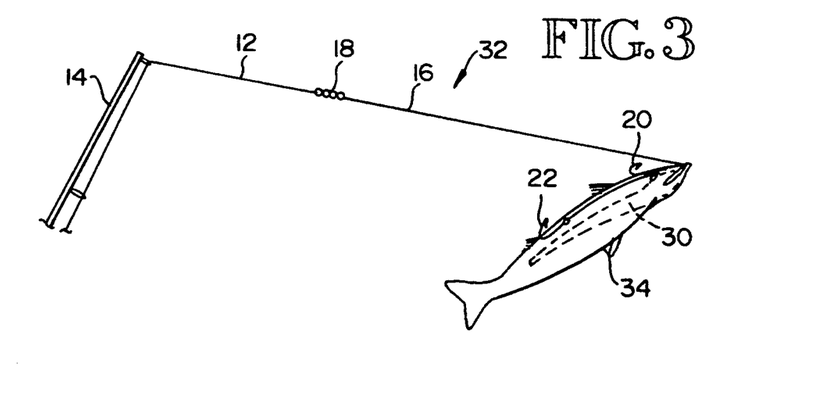
FIG. 3 is a diagram of a fishing line rigged with fish bait and the internal bait weight apparatus according to an embodiment of this invention.
Figure 4:
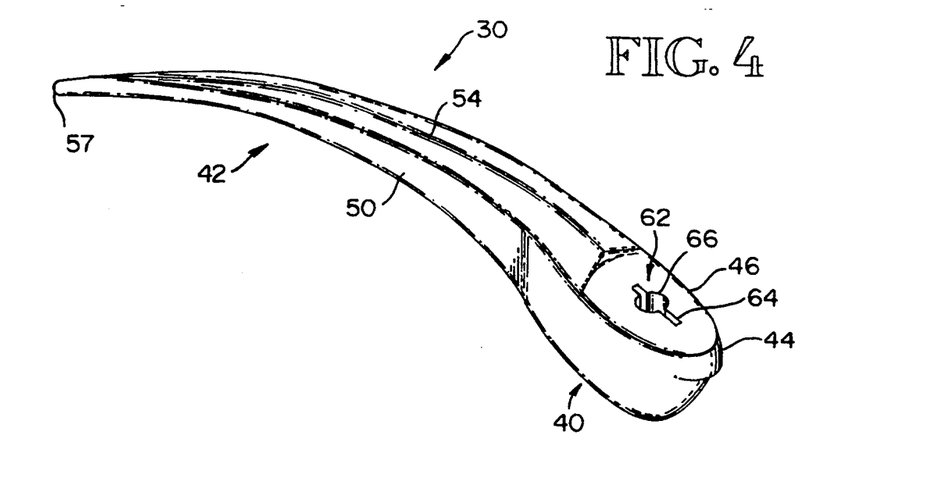
FIG. 4 is a perspective view of the internal bait weight apparatus according to an embodiment of this invention.
Figure 5:
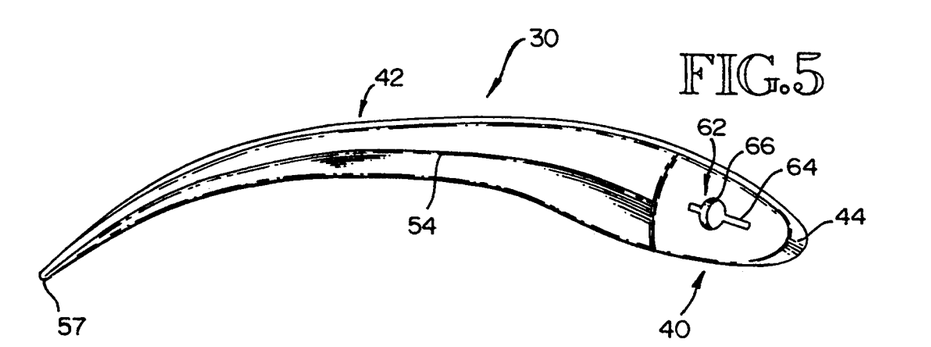
FIG. 5 is a plane view (top) of the internal bait weight apparatus of FIG. 4.
Figure 6:
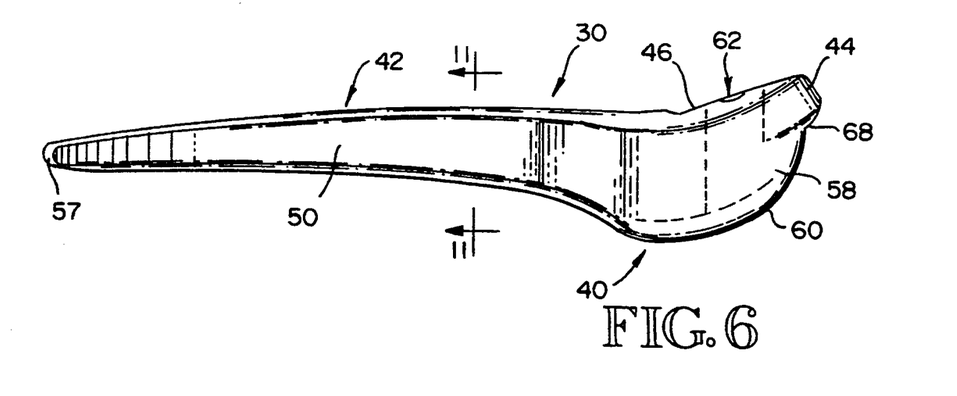
FIG. 6 is a plane view (side) of the internal bait weight apparatus of FIG. 4.
Figure 7:
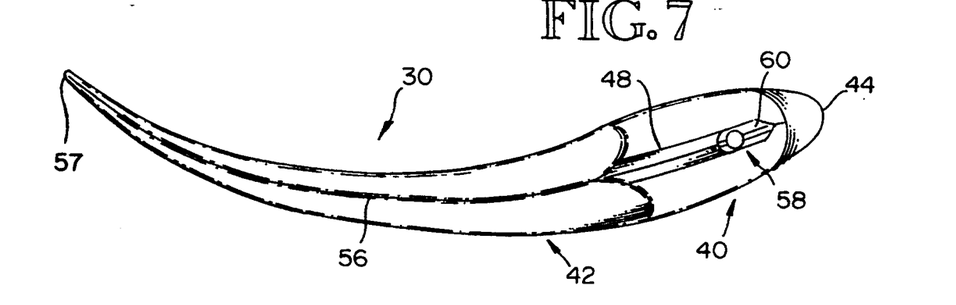
FIG. 7 is a plane view (bottom) of the internal bait weight apparatus of FIG. 4.
Figure 8:
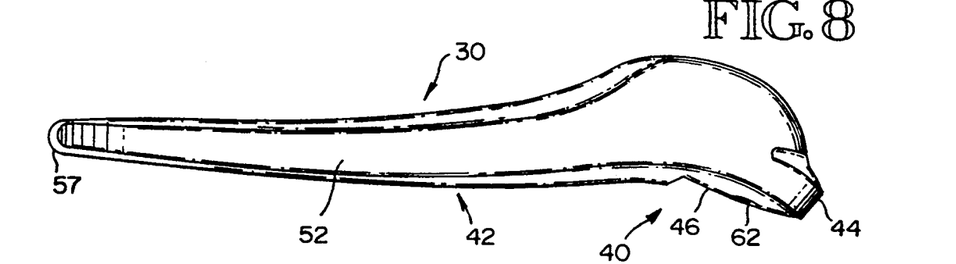
FIG. 8 is a plane view (side) of the internal bait weight apparatus of FIG. 4.
Figure 9:
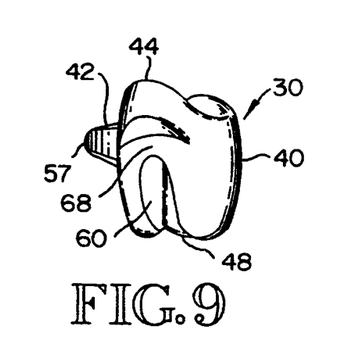
FIG. 9 is a plane view (front) of the internal bait weight apparatus of FIG. 4.
Figure 10:
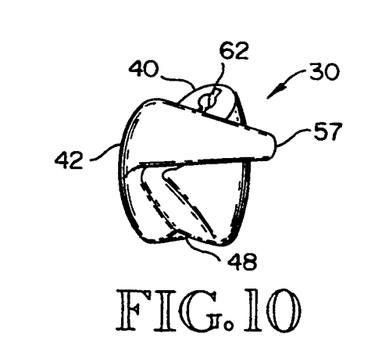
FIG. 10 is a plane view (rear) of the internal bait weight apparatus of FIG. 4.

FIG. 2 shows an alternative rigging 32 with an internal weight apparatus 30 according to an embodiment of this invention. The weight apparatus 30 replaces the sinker 24 of conventional riggings. Without fish bait hooked to the leader 16, the weight apparatus 30 is free to move along the leader 16 between hook 20 and pole 14. FIG. 3 shows the weight apparatus 30 inserted into a bait fish 34. With the top hook 20 set into cartilage along the head of the bait, the bottom hook 22 set into the fish tail region, and the weight apparatus 30 inserted into the fish 34, the weight apparatus 30 is stationary along the leader 16 adjacent to top hook 20.

A benefit of allowing the weight apparatus 30 to move along the leader 16 when not inserted in bait 34 is realized when a sport or commercial fish takes the bait 34 and gets hooked. As the sport or commercial fish runs with the line and shakes the bait 34 back and forth in its mouth, the inertia due to the weight of apparatus 30 might tear the hooks 20, 22 and bait 34 from the sport or commercial fish. By having the apparatus 30 free to move along the line, the shaking of the bait 34 causes the apparatus 30 and/or the bait fish to pull out of the sport fish's mouth and move up the leader 16. Thus, the sport or commercial fish can remain hooked without negative effects from the weight apparatus 30. Another advantage is to the sport or commercial fish that get away. Sometimes a sport or commercial fish breaks the line during its fight. As a result the fish may swim off with the hooks 20, 22 and leader 16 trailing behind. Because the weight apparatus 30 is free to move along the line, the weight apparatus 30 falls from the leader 16 and is not dragged around by the sport or commercial fish "that got away."

Bait Weight Apparatus

FIGS. 4-11 show alternate views of the internal bait weight apparatus 30 according to one embodiment of this invention. The apparatus 30 is generally shaped to the internal dimensions of a typical fish having a large mouth area and smaller trailing stomach and digestive cavity area. Accordingly, the apparatus 30 includes a bulbous head portion 40 and a tapered tail portion 42. In a preferred embodiment, the tail portion is longer than the internal digestive cavity of the bait, so that when installed, the apparatus 30 reaches beyond the digestive cavity and stomach into the tail of the bait. In one embodiment, the apparatus head portion 40 is shaped to take on specific variations in the bait's mouth dimensions.

Bulbous Head 40: The head portion 40 fits within the bait's mouth with the mouth being able to close around the bulbous head 40 (See FIGS. 3, 12, 13). Preferably, a bumper section 44 of head 40 protrudes from the bait's mouth when the apparatus 30 is inserted (See FIGS. 6, 12). A front section 46 of the head portion 40 is angled relative to the remainder of the head portion 40 and tail portion 42 (See FIGS. 6, 8). The angle moves the center of balance of the weight apparatus 30 forward so that once inserted in the bait, the bait's center of gravity is nearly the same or moved forward.

Recessed Channel 48: A recessed channel 48 formed as an elongated indentation runs along the base of the head 40 from a point near the bumper section 44 toward the tail portion 42 (See FIGS. 6, 7, 10). When the apparatus 30 is inserted, neck cartilage at the bottom of the bait's mouth sticks up into in the recessed channel enabling a better fit within the mouth. The mating of the cartilage and recessed channel 48 enables the baits mouth to close and prevents the weight apparatus 30 from rotating or significantly changing position within the bait.

Figure 11:
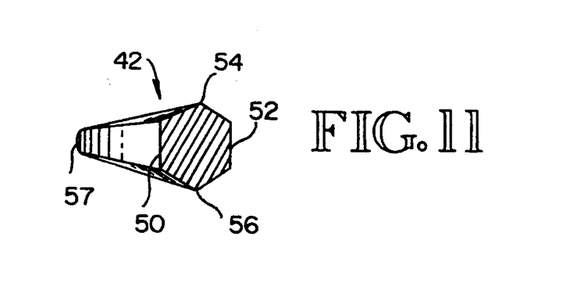
FIG. 11 is a cut away view of the internal bait weight apparatus of FIG. 4 at the tail portion.

Tail Portion 42: The apparatus tail portion 42 is shown in FIGS. 4-10 to bend in one plane (i.e., rather than corkscrew into multiple planes). Thus, the tail portion 42 is shown as curved in the top and bottom views of FIGS. 5 and 7, and as straight (i.e., curved into or out of the page) in the side views of FIGS. 6 and 8. The cross-sectional view of FIG. 11 shows the tail portion 42 has two generally flat side walls 50, 52 and contours to a top and bottom ridge 54, 56. The side walls 50, 52 are generally parallel and define a plane in which the tail bend occurs. As the tail portion 42 is bent, the curve forms along the ridges 54, 56. The structure of the tail portion 42 acts as a built-in guide for defining the plane of curvature. In one embodiment, the tail portion 42 is generally rigid to maintain its curve during use, yet malleable enough for a fisherman to change the curve to his liking. The tighter (i.e., more angled) the curve, the wilder (i.e., more vigorous) the spin of the bait when pulled through the water.

The tail portion 42 tapers down to a curved, generally blunt end 57. A blunt end is preferable over a pointed end so that the end 57 is not accidently pushed through the bait's side when the apparatus 30 is inserted. In one embodiment the apparatus 30 is longer than the length between the bait's mouth opening and the bait's stomach. Thus, when the apparatus 30 is inserted, the tail portion 42 is pushed through the stomach into the tail section of the bait (See FIG. 12). The added length of apparatus 30 into the tail of the bait curves the bait along a longer axis. The longer axis provides better control over the bait's swimming pattern (i.e., action).

Channel 58: A through channel 58 for receiving the leader 16 and hooks 20, 22 is formed through the bulbous head portion 40 (See FIG. 6, 7). A first channel opening 60 is formed along the bottom surface of the head portion 40 (See FIGS. 7, 9), while a second channel opening 62 is formed at the top surface of the head portion 40 (See FIGS. 4, 5). In one embodiment, the first opening 60 is tear-shaped with a narrow end forward toward a distal end of the head 40 and a wide end rearward toward the tail portion 42. In one embodiment, the second opening 62 is key-hole shaped having a narrow slit 64 and a wider entry 66 located along the slit 64 (See FIG. 4, 5). The wider entry 66 is sized to enable the eye of a typical hook used with a given apparatus 30 to fit. The narrow portions along the slit 64, however, are too narrow for the eye to fit. During installation, hooks 20, 22 are inserted through the first opening 60 and out the second opening 62. When the line 12, 16 is pulled, it is forced into the narrow section of slit 64. As the hook 20 or 22 is pulled to the opening 62 the eye is pulled up against the narrow portion of slit 64. As a result, the hooks are unable to travel back through the channel 58 by pulling on line 12, 16. The hook's eye has to be turned to get the hook through the key way opening.

Ridge 68: In one embodiment the narrow portion of the tear-shaped opening 60 and the narrow slit portion of the key-hole shaped opening 62 are on opposite sides of the bumper section 44 in the vicinity of the bumper. Preferably a ridge 68 is formed between the bumper section 44 and the tear-shaped opening 60. (See FIGS. 6, 9). This ridge 68 keeps the line 12, 16 from cutting the bait's lower jaw when the mouth is closed around the bulbous head portion 40 and the line is pulled through the water. The ridge 68 also centers the apparatus 30 balancing point to make the apparatus 30 spin in a balanced manner.

Operation

Figure 12:
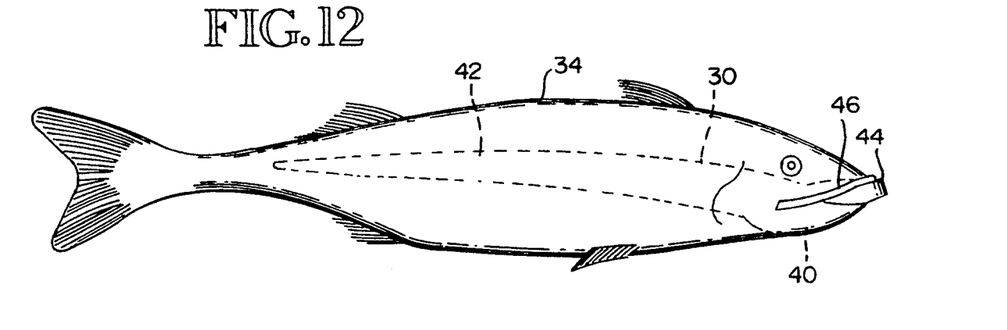
FIG. 12 is a plane view of a fish with the inserted bait weight apparatus according to an embodiment of this invention.
Figure 13:
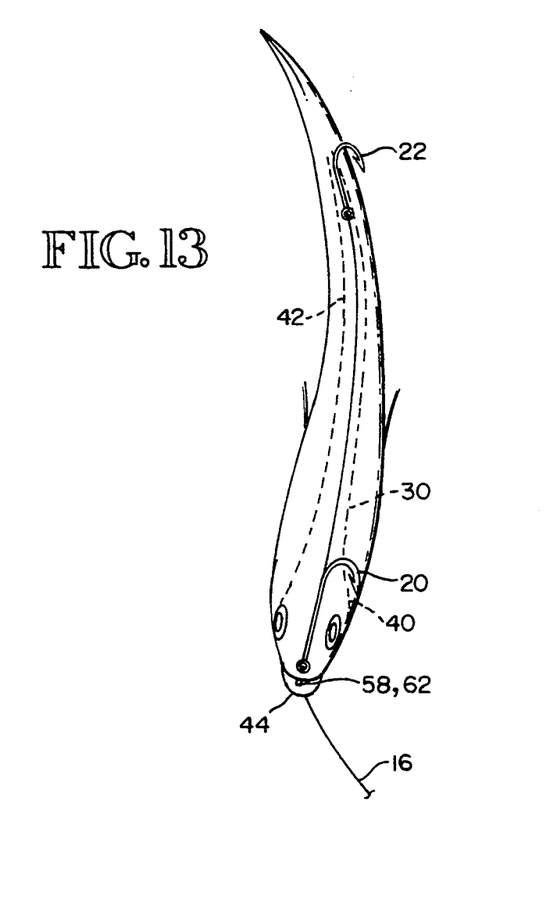
FIG. 13 is another plane view of a fish and line rigging with the bait weight apparatus inserted according to an embodiment of this invention.

The apparatus 30 is inserted into a fish to be used as bait through the fish's mouth. The apparatus tail portion 42 is inserted first, being pushed into the mouth to the stomach, then through the rear wall of the stomach toward the tail of the fish 34. The apparatus 30 has a top, bottom, first and second side corresponding to the top, bottom, first and second sides of the fish 34. The apparatus tail portion 42 is curved along an arc. Once installed, the bait's tail is curved to its side (i.e., resembling the bending of the tail when the fish swims, so as to cause spinning action of the bait when the line is pulled through the water). FIG. 12 shows a side view of a fish 34 having the apparatus 30 inserted. FIG. 13 shows a top view of the fish 34 with the apparatus 30 inserted and hooks 20, 22 attached. Typically the apparatus 30 and hooks 20, 22 are attached to the line 12, 16 before the apparatus 30 is inserted. Once the apparatus 30 is inserted, the line 12, 16 is pulled moving the hooks 20, 22 toward the head of the bait 34 and the channel 58 of apparatus 30. When the line is pulled tight, the eye of hook 20 is blocked by the slit 64 in opening 62 (see FIG. 5). The top hook 20 then is set in the bait's head and the bottom hook 22 is set toward the bait's tail.

In another application, the apparatus 30 is inserted before the fishing line 12, 16 and hooks 20, 22 are fed through channel 58. With the apparatus inserted, the hooks 20, 22 are pushed through the bait's lower jaw, then into the channel 58 through tear-shaped opening 60, turned out key-hole shaped opening 62, and through the bait's head. The top hook 20 is set in the cartilage of the head, while the bottom hook 22 is set in the tail.

When the bait 34 is placed in the water, the apparatus 30 causes the bait to sink head first. Depending on the weight of the apparatus 30, the water current and the pull on the line 12, 16, the bait sinks to a certain depth. Should the apparatus 30 sink to the sea bottom, the bumper section 44 strikes first. Thus, the mouth and head of the fish do not get smashed when the combination strikes bottom. Once the apparatus 30 hits bottom, it will tend to fall to its side. As a result, the hooks 20, 22 set into the top surface of the bait 34 do not fall directly to the bottom, thereby reducing the risk of having the hooks 20, 22 snag on the sea bottom. As the apparatus 30 and bait 34 are pulled through the water, the curvature applied to the bait causes it to spin back and forth. The degree of spin or swing (i.e., action) is determined by the amount of curve on the apparatus the tail portion 42 and on the force applied to the line 12, 16. The action can be altered by changing the curvature of the tail portion 42. The curvature causes the bait to have a vigorous spin when pulled fast and a wobbling back and forth swing when pulled slow.

Alternative Embodiments

In a preferred embodiment, the apparatus 30 is formed out of lead enabling a heavy weight for a given size. Lead also is sufficiently rigid to maintain its shape once a curvature is applied, yet malleable enough for a fisherman to change the curvature. In another embodiment, the apparatus is formed from a light weight material such as rubber, plastic or aluminum for use with down-riggers, or in surface or near.

A typical fish used for bait in sport and commercial fishing is herring. Common herring bait ranges in size from 6 inches to 9 inches. For each size bait a different size apparatus 30 may be used to achieve the optimum fit within the bait and optimum performance. Table 1 below shows the physical dimension of the apparatus 30 for different size herring bait 34.

TABLE 1

| Measurement/ Herring Length | 6" | 6.5–7" | 7.5" | 7.5–8" | 9" |
| --- | --- | --- | --- | --- | --- |
| Nose to gill diameter | 1.30" | 1.40" | 1.65" | 1.7" | 2.0" |
| Nose to end of apparatus dia. | 5.30" | 5.25–5.50" | 6.25" | 7–7.25" | 8.25–8.5" |
| Nose to vent diameter | 3.70" | 4.0" | 4.55" | 4.90" | 5.5–5.75" |
| Mouth opening diameter | .60" | .65" | 0.70" | .75" | .80" |
| Throat opening diameter | .35" | .40" | .45" | .50" | .60" |
| Stomach diameter | .30" | .35" | .37" | .40" | .50" |
| Weight of apparatus 30 | 3 oz. | 4.5 oz. | 6 oz. | 8 oz. | 1–1.5 lbs. |
| Weight of herring 34 | 1 oz. | 1.12–1.25 oz. | 1.5–1.75 oz. | 2–2.5 oz. | 3.25–3.75 oz |
| TOTAL | 4 oz. | 5.75 oz. | 7.5–7.75 oz. | 10 oz. | 16 oz.+ |
| True wt. under water | 3.5 oz. | 4.75 oz. | 6.75 oz. | 9 oz. | 17.5 oz.+ |

In one embodiment the apparatus 30 is formed without curvature at the tail end 42 and without an angle set at the head portion 40.

Concluding Remarks

Although a preferred embodiment of the invention has been illustrated and described, various alternatives, modifications and equivalents may be used. For example, although the tail portion is described as bending from side to side, the tail portion may be straight or may bend both to the side and upward or downward. Therefore, the foregoing description should not be taken as limiting the scope of the inventions which are defined by the appended claims.

What is claimed is:

1. A line fishing apparatus for insertion inside a fish used for bait in water, the bait fish having a mouth, digestive cavity, and tail, the apparatus generally shaped to the internal dimensions of the fish by comprising a bulbous head portion and a tapered barbless tail portion;

the head portion fitting inside the fish mouth while the apparatus is inserted in the fish;

the head portion defining a through channel having a first opening and a second opening, the channel for receiving a hook and a fishing line;

the barbless tail portion tapered continuously from the bulbous head portion to a distal end enabling the apparatus to slide out of the fish once inserted.

2. The line fishing apparatus of claim 1 in which the through channel is defined at a section of the head portion fitting inside the fish while the apparatus is inserted, and the head portion has a raised bumper section protruding from the fish's mouth while the apparatus is inserted.

3. A line fishing apparatus for insertion inside a fish used for bait in water, the bait fish having a mouth, digestive cavity, and tail, the apparatus generally shaped to the internal dimensions of the fish by comprising a bulbous head portion and a tapered tail portion;

the head portion fitting inside the fish mouth while the apparatus is inserted in the fish;

the head portion defining a through channel having a first opening and a second opening, the channel for receiving a hook and a fishing line, the second opening having a narrow section and a wide section, the narrow section too narrow to pass an eye portion of the hook;

the tail portion tapered from the bulbous head portion toward a distal end.

4. The line fishing apparatus of claim 3 in which the head portion has a raised bumper section protruding from the fish's mouth while the apparatus is inserted.

5. The line fishing apparatus of claim 4 in which the first and second channel openings are on opposite sides of the bumper portion, the head portion defining a ridge between the bumper and the first opening for protecting the fish lower jaw from being torn when the line is pulled.

6. The line fishing apparatus of claim 3 in which the tail portion is generally rigid to sustain its shape and in which the tail portion forms a curved arc applied to the bait fish when inserted for inducing either of a swinging or spinning action as the apparatus is pulled through the water.

7. The line fishing apparatus of claim 6 in which the generally rigid tail portion is malleable enough to bend for changing the arc.

8. The line fishing apparatus of claim 3 in which the bulbous head portion is angled relative to the tapered tail portion.

9. A line fishing apparatus for insertion inside a fish used for bait in water, the bait fish having a mouth, digestive cavity, and tail, the apparatus generally shaped to the internal dimensions of the fish by comprising a bulbous head portion and a tapered tail portion;
  the head portion fitting inside the fish mouth while the apparatus is inserted in the fish;
  the head portion defining a through channel having a first opening and a second opening, the channel for receiving a hook and a fishing line;
  the head portion defining an elongated indentation running toward the tail portion;
  the tail portion tapered from the bulbous head portion toward a distal end.

10. A line fishing rigging and fish used for bait, the fish having a mouth, digestive cavity and tail, the rigging comprising: a fishing line, hook, and internal apparatus; the hook comprising an eye, a shank and a crook; the internal apparatus comprising:
  a bulbous head portion and a tapered barbless tail portion, the tail portion inserted into the fish through the fish mouth, to the fish digestive cavity and protruding through the digestive cavity toward the fish tail, the tail portion tapered continuously from the bulbous head portion to a distal end and slidable out of the fish once inserted;
  the head portion having a raised bumper section, the head portion fitting inside the fish mouth with the bumper section protruding from the mouth, the head portion defining a through channel having a first opening and a second opening, the channel receiving the hook and fishing line.

11. The line fishing apparatus of claim 10 in which the bulbous head portion of the internal apparatus is angled relative to the tapered tail portion.

12. A line fishing rigging and fish used for bait, the fish having a mouth, digestive cavity and tail, the rigging comprising: a fishing line, hook, and internal apparatus; the hook comprising an eye, a shank and a crook; the internal apparatus comprising:
  a bulbous head portion and a tapered tail portion, the tail .portion inserted into the fish through the fish mouth, to the fish digestive cavity and protruding through the digestive cavity toward the fish tail, the tail portion tapered from the bulbous head portion toward a distal end;
  the head portion having a raised bumper section, the head portion fitting inside the fish mouth with the bumper section protruding from the mouth, the head portion defining a through channel having a first opening and a second opening, the channel receiving the hook and fishing line; the second opening at the head portion of the internal apparatus formed as an elongated slit with a first area along the slit having a wider cross section than a second area along the slit, the second area having a cross section too narrow to pass the eye of the hook.

13. A line fishing rigging and fish used for bait, the fish having a mouth, and tail, the rigging comprising: a fishing line, hook, and internal apparatus; the hook comprising an eye, a shank and a crook; the internal apparatus comprising:
  a bulbous head portion and a tapered tail portion, the tail portion inserted into the fish through the fish mouth, to the fish digestive cavity and protruding through the digestive cavity toward the fish tail, the tail portion tapered from the bulbous head portion toward a distal end;
  the head portion having a raised bumper section, the head portion fitting inside the fish mouth with the bumper section protruding from the mouth, the head portion defining a through channel having a first opening and a second opening, the channel receiving the hook and fishing line; the head portion defining an elongated indentation for receiving fish cartilage at the base of the bait fish mouth, the indentation running along the head portion toward the tail portion.

14. A line fishing rigging and fish used for bait, the fish having a mouth, digestive cavity and tail, the rigging comprising: a fishing line, hook, and internal apparatus; the hook comprising an eye, a shank and a crook; the internal apparatus comprising:
  a bulbous head portion and a tapered tail portion, the tail portion inserted into the fish through the fish mouth, to the fish digestive cavity and protruding through the digestive cavity toward the fish portion tapered from the bulbous head portion toward distal end;
  the head portion having a raised bumper section, the head portion fitting inside the fish mouth with the bumper section protruding from the mouth, the head portion defining a through channel having a first opening and a second opening., the channel receiving the hook and fishing line; the first and second channel openings on opposite sides of the bumper portion, a ridge formed between the bumper and the first opening for protecting the fish mouth from being torn when the line is pulled.

15. A method of rigging a fishing line, hook and fish used for bait with an internal bait apparatus having a bulbous head portion and tapered tail portion, the head portion having a bumper section and defining a through channel with a first opening and second opening on opposite sides of the bumper section, the bait fish having a mouth, stomach and tail, comprising the steps of:
  inserting the tail portion of the internal bait apparatus into the mouth of the bait fish;
  pushing the tail portion through the mouth, into the stomach and through the stomach of the bait fish into the tail of the bait fish without poking the apparatus tail portion out a side of the bait fish;
  closing the mouth around the bulbous head portion leaving the bumper section protruding from the mouth;
  passing the hook and attached trailing fishing line through the first opening and second opening of the through channel either one of before the insertion step or after the insertion step; and
  setting the hook into the bait fish.

16. A line fishing apparatus for insertion inside a fish used for bait in water, the bait fish having a mouth, digestive cavity, and tail, the apparatus generally shaped to the internal dimensions of the fish by comprising a bulbous head portion and barbless tail portion;
  the head portion fitting inside the fish mouth while the apparatus is inserted in the fish;
  the head portion defining a through channel having a first opening and a second opening, the channel for receiving a hook and a fishing line, the second opening having a narrow section and a wide section, the narrow section too narrow to pass an eye portion of the hook; and the barbless tail portion tapered from bulbous head portion toward a distal end.

17. The line fishing apparatus of claim 16 in which the bulbous head portion defines an elongated indentation running toward the tail portion.

18. The line fishing apparatus of claim 17 in which the head portion defines a bumper portion and the first and second channel openings are on opposite sides of the bumper portion, the head portion defining a ridge between the bumper portion and the first opening for protecting the fish lower jaw from being torn when the line is pulled.

19. A line fishing rigging and fish used for bait, the fish having a mouth, digestive cavity and tail, the rigging comprising: a fishing line, hook, and internal apparatus; the hook comprising an eye, a shank and a crook; the internal apparatus comprising:

a bulbous head portion and a tail portion, the tail portion inserted into the fish through the fish mouth, to the fish digestive cavity and protruding through the digestive cavity toward the fish tail, the tail portion tapered from the bulbous head portion toward a distal end;

the head portion having a raised bumper section, the head portion fitting inside the fish mouth with the bumper section protruding from the mouth, the head portion defining a through channel having a first second opening, the channel receiving the hook and fishing line, the second opening at the head portion of the internal apparatus formed as an elongated slit with a first area along the slit having a wider cross section than a second area along the slit, the second area having a cross section too narrow to pass the eye of the hook.

* * * * *